United States Patent
Bhoopali et al.

(10) Patent No.: US 12,314,601 B2
(45) Date of Patent: May 27, 2025

(54) READ ACCESS MANAGEMENT OF HOST PERFORMANCE BOOSTER (HPB) REGIONS BY A STORAGE DEVICE

(71) Applicant: WESTERN DIGITAL TECHNOLOGIES, INC., San Jose, CA (US)

(72) Inventors: Laxmi Bhoopali, Bangalore (IN); Ramanathan Muthiah, Bangalore (IN); Savita Neelannavar, Bangalore (IN)

(73) Assignee: SANDISK TECHNOLOGIES INC, Milpitas, CA (US)

( * ) Notice: Subject to any disclaimer, the term of this patent is extended or adjusted under 35 U.S.C. 154(b) by 0 days.

(21) Appl. No.: 18/228,799

(22) Filed: Aug. 1, 2023

(65) Prior Publication Data

US 2025/0044977 A1 Feb. 6, 2025

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 8,788,778 B1 | 7/2014 | Boyle | |
| 11,061,598 B2 | 7/2021 | Bazarsky | |
| 2014/0240335 A1* | 8/2014 | Hu | G06F 12/0871 345/543 |
| 2016/0085455 A1* | 3/2016 | Cohen | G06F 3/0611 711/103 |
| 2019/0220396 A1* | 7/2019 | Lin | G06F 12/0246 |
| 2020/0081832 A1* | 3/2020 | Hsu | G06F 12/0253 |
| 2022/0004341 A1 | 1/2022 | Chen | |
| 2022/0004498 A1* | 1/2022 | Chen | G06F 3/0647 |
| 2022/0100671 A1* | 3/2022 | Byun | G06F 3/0679 |

OTHER PUBLICATIONS

Jeong Wookhan, Hyunsoo Cho, Yongmyung Lee, Jaegyu Lee, Songho Yoon, Jooyoung Hwang and Dong-Gi Lee; Improving Flash Storage Performance by Caching Address Mapping Table in Host Memory; 2017, HotStorage, Jul. 10.

Paik Joon-Young, Eun-Suncho, Rize Jin and Tae-Sun Chung .; Selective-delay garbage collection mechanism for read operations in multichannel flash-based storage devices; 2018, IEEE Transactions on Consumer Electronics, Mar. 8, vol. 64, No. 1, pp. 118-126.IEEE.

* cited by examiner

*Primary Examiner* — Jane W Benner
(74) *Attorney, Agent, or Firm* — Arlene Neal; Neal Blibo LLC

(57) ABSTRACT

A storage device may be coupled to a host device and the storage device may support a host performance booster (HPB) feature. A controller on the storage device may execute a background relocation operation. During the background relocation operation, the controller may identify a block to relocate data from. The controller may also determine that a relocation system threshold has not been reached. The controller may execute a source selection algorithm configured to minimize HPB entry inactivation resulting from data relocation. The source selection algorithm may include a criterion to enable the controller to select a source block for relocation.

20 Claims, 7 Drawing Sheets

READ ACCESS MANAGEMENT OF HOST PERFORMANCE BOOSTER (HPB) REGIONS BY A STORAGE DEVICE

BACKGROUND

A host may transmit a command to read data from and/or write data to, for example, a flash memory device coupled to a storage device. The storage device may be a Universal Flash Storage (UFS) device. The storage device may store data in blocks on the memory device wherein the data may be addressed using logical block addresses that may be mapped one-to-one to physical addresses on the memory device. The one-to-one logical block address to physical address mappings may be stored in a logical-to-physical (L2P) table.

A UFS storage device may operate wherein the storage device may cache the L2P table and access the L2P table to retrieve data from the memory device. When the host issues a read command to read data from the memory device, the host may transmit the logical block address for the data to the storage device. The storage device may access the cached L2P table and use the logical block address to determine the physical address where the data is stored on the memory device. The storage device may fetch the data from the physical address on the memory device that is associated with the logical block address sent from the host.

The UFS storage device may support a host performance booster (HPB) feature. The HPB feature may enable the host to boost the read performance on the storage device. When the storage device is initialized, the host may determine if the storage device supports the HBP feature, and if it does, the host may activate a device-control mode or host-control mode on the storage device and allocate space in the host memory for an HPB cache. In the device control mode, the storage device may select an HPB sub-region and in the host control mode, the host may indicate to the storage device which HPB sub-region to select. The L2P table for the selected HPB may be cached by the storage device. The host may issue an HPB read buffer command to obtain the L2P table from the storage device. In response to the HPB read buffer command, the storage device may provide portions of the L2P table (referred to herein as a HPB region) to be cached in the host memory and the host may store the L2P table mappings for the HPB region in the HPB cache in the host memory. When the host wants to retrieve data associated with entries in the HPB region, the host may issue an HPB read command to read the data from the memory device. The host may obtain the physical addresses for the data from the HPB cache for a given logical address and include the logical and physical addresses for the data in the HPB read command sent to the storage device. The storage device may fetch the data from the memory device using the physical address in the HPB read command sent from the host. The storage device may thus execute the HPB read command faster than a regular read command as the storage device may use the information in the HPB read command to retrieve the data from the memory device, without having to read the L2P table cached on the storage device.

A controller on the storage device may process background operations including, for example, executing internal operations to manage the resources on the storage device. In managing the resources of the storage device, the controller may execute relocation functions including compaction, read scrubbing, wear leveling, garbage collection, and the like, to move data from one location to another on the memory device, optimize how space on the memory device is used, and improve efficiency. During background operations, the controller may move data associated with addresses in the HPB region, thereby invalidating the entries in the table in the HPB cache in the host memory. The storage device may send inactive HPB region information and/or update information to the host for the host to update the table in the HPB cache. Frequent inactivation and updates of HPB regions due to background relocation operations may degrade the storage device's performance.

SUMMARY

In some implementations, a storage device may support a host performance booster (HPB) feature. The storage device may be communicatively coupled to a host device and to a memory device divided into blocks, wherein data is stored on the blocks in the memory device. The storage device may include a controller to execute a background relocation operation. During the background relocation operation, the controller may identify a block to relocate data from and determine that a relocation system threshold has not been reached. The controller may execute a source selection algorithm configured to minimize HPB entry inactivation resulting from data relocation. The source selection algorithm may include a criterion to enable the controller to select the block as a source block for relocation.

In some implementations, a method is provided to minimize HPB entry inactivation resulting from data relocation in a storage device supporting an HPB feature. The method includes activating the storage device to support the HPB feature and executing a background relocation operation by a controller on the storage device. The method further includes, during the background relocation operation identifying, a block to relocate data from, determining that a relocation system threshold has not been reached, and executing a source selection algorithm configured to minimize HPB entry inactivation resulting from data relocation. The source selection algorithm may include a criterion to enable the controller to select the block as a source block for relocation.

In some implementations, the controller may create an HPB garbage collection table according to HPB buffer read requests. The controller may also determine associated logical addresses in the source block from a physical-to-logical table, compare the logical addresses with HPB entries in an HPB read list, and identify if there are HPB entries in the source block. The controller may execute the source selection algorithm using one of the HPB garbage collection table and the HPB read list.

Figure 1:
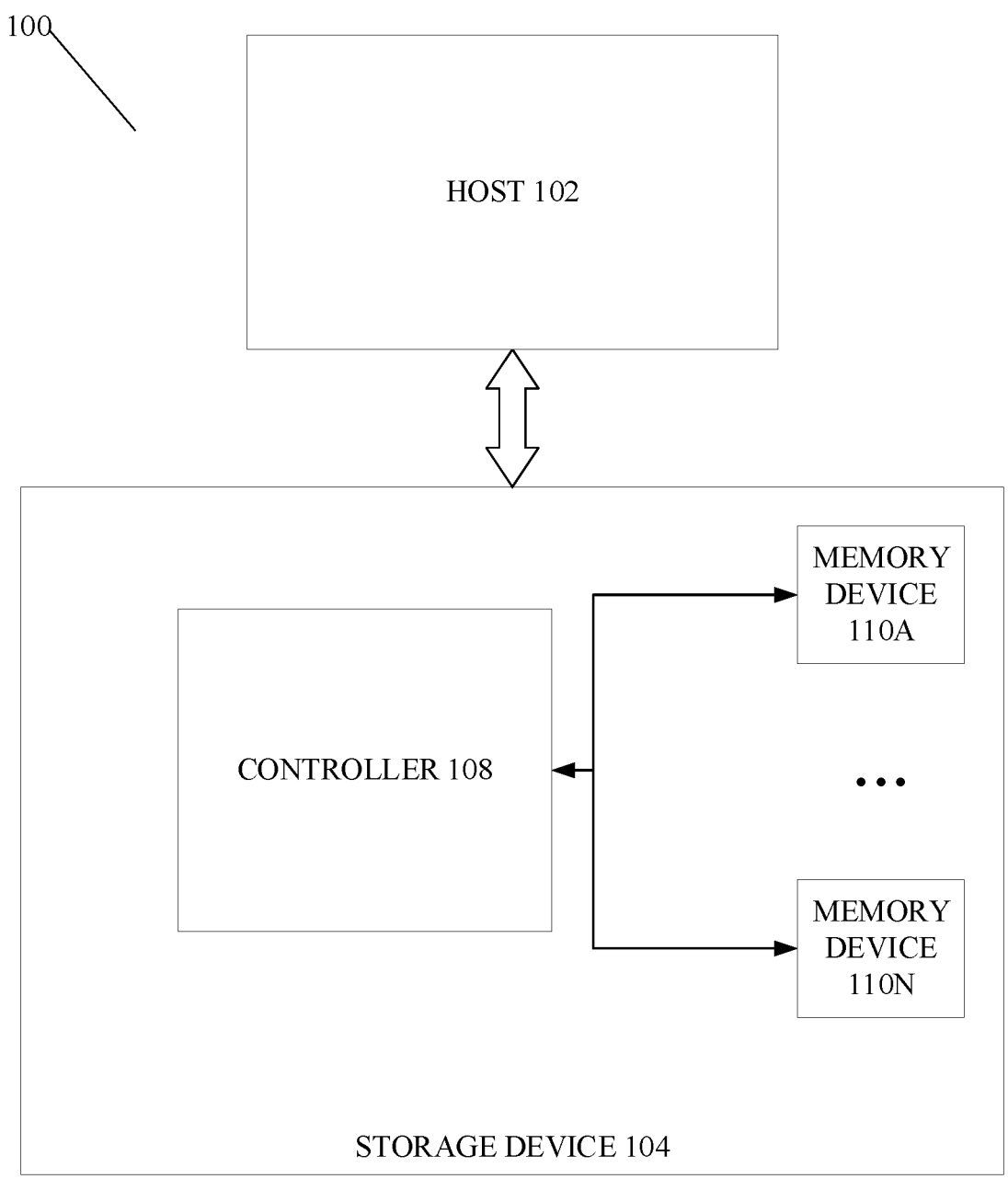
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may include a controller 108 and one or more memory devices 110a-110n (referred to herein as memory device(s) 110). Storage device 104 may be, for example, a Universal Flash Storage (UFS) device, and the like. Storage device 104 may support a host performance booster (HPB) feature. The HPB feature may enable host 102 to boost the read performance on storage device 104.

Memory device 110 may be flash based, including, for example, NAND flash memory. Memory device 110 may be included in storage device 104 or may be otherwise communicatively coupled to storage device 104. Memory device 110 may be divided into blocks and data may be stored in the blocks in various formats, with the formats being defined by the number of bits that may be stored per memory cell. For example, a single-layer cell (SLC) format may write one bit of information per memory cell, a multi-layer (MLC) format may write two bits of information per memory cell, a triple-layer (TLC) format may write three bits of information per memory cell, and a quadruple-layer cell (QLC) format may write four bits of information per memory cell, and so on. Formats storing fewer bits in each cell are more easily accessed, durable, and less error-prone than formats storing more bits per cell. However, formats storing fewer bits in each cell are also more expensive.

Controller 108 may process foreground operations including HPB read instructions transmitted from host 102. When storage device 104 is initialized, host 102 may determine if storage device 104 supports the HBP feature, and if it does, host 102 may activate a device-control mode or host-controlled mode on storage device 104 and allocate space in the host memory for an HPB cache. In the device-control mode, storage device 104 may select an HPB sub-region and in the host-control mode, host 102 may indicate to storage device 104 which HPB sub-region to select. The L2P table for the selected HPB sub-region may be cached by storage device 104. The host may issue an HPB read buffer command to storage device 104 to obtain the L2P table from storage device 104. In response to the HPB read buffer command, the storage device may provide portions of the L2P table (referred to herein as an HPB region) to be cached in the HPB cache in the host memory. Host 102 may store the L2P table mappings for the HPB region in the HPB cache. When the host wants to retrieve data associated with entries in the HPB region, the host may issue an HPB read command to read the data from the memory device.

When controller 108 receives the HPB read buffer command from host 102, controller 108 may create an HPB-garbage collection (GC) table and store the HPB-GC table on storage device 104. The HPB-GC table may include information that identifies the blocks in memory device 110 including HPB entries and the number of HPB entries associated with a block. Controller 108 may update an HPB counter associated with a block in the HPB-GC table, wherein the HPB counter may indicate the number of HPB entries associated with the block. Controller 108 may populate and update the HPB-GC table according to HPB buffer read requests.

Controller 108 may also execute background operations to manage resources on memory device 110. For example, controller 108 may monitor memory device 110 and may execute garbage collection and other relocation functions per internal relocation algorithms to refresh and/or relocate the data on memory device 110. Data relocation on memory device 110 may result in changes to logical-to-physical mappings which may cause an HPB entry in the HPB cache in host 102 memory to become invalid. When an HPB entry in the HPB cache becomes invalid, storage device 104 may notify host 102 for host 102 to inactivate the HPB entry. Controller 108 may update the HPB counter associated with a block in, for example, a first case while activating or deactivating HPB entries in the block due to data relocation and in a second case when host 102 or storage device 104 invalidates the selected HPB region in memory device 110. When the counter associated with a block reaches zero, controller 108 may remove the block from the HPB-GC table.

A high level of HPB entry inactivation resulting from data relocation during background operations may lead to high overhead and defeat the purpose of performing HPB reads. During relocation, controller 108 may check existing relocation criteria including, for example, a minimum validity count. Controller 108 may identify a source block (i.e., a block to be relocated) and may also determine if a relocation system threshold for relocation has been reached. If the system threshold has been reached, controller 108 may select the identified source block for relocation. If the system threshold has not been reached, controller 108 may execute a source selection algorithm including criteria to enable controller 108 to select blocks having no logical block addresses that are associated with active HPB entries in the HPB cache. The source selection algorithm may also enable controller 108 to select a source block with a minimum number of HPB mappings as shown, for example, by the HPB counter in the HPB-GC table. This may avoid the overhead associated with inactivating multiple HPB entries because of data relocation and/or reloading multiple updated HPB entries to the HPB cache to account for changed logical-to-physical address mappings after data relocation. Controller 108 may thus improve performance on storage device 104 by minimizing HPB entry inactivation resulting from data relocation during background operations. Controller 108 may also avoid or delay the relocation of source blocks with logical block addresses that are mapped to active HPB regions until, for example, the system threshold is reached or until host 102 clears the associated HPB entry, whichever may be earlier.

In some cases, controller 108 may maintain a relocation table of relocated HBP entries. When host 102 issues an HBP read command that is associated with a relocated block, controller 108 may use the relocation table to determine how to retrieve the data associated with the HBP read command from memory device 110. In other cases, controller 108 may inform host 102 of the relocation of the block with an HPB entry and send an updated logical-to-physical mapping for the relocated block with the HPB entry to host 102. Storage device 104 may use fewer system resources and time in the flash translation layer than would otherwise be used if controller 108 had not minimized HPB entry deactivation because of data relocation.

When an HPB entry in a block is removed from the HPB cache in host 102, assuming that no other HPB entries are associated with the block from which the HPB entry is removed, the block may be identified to be used in data relocation operations either proactively, through periodic monitoring, and/or on demand. Controller 108 may set one or more urgent thresholds wherein when the urgent threshold is met, controller 108 may perform relocation on any source block, with or without HPB entries, selected by controller 102.

In some storage device architectures, storage device 104 may include a physical-to-logical table. When host 102 issues an HPB read command to storage device 104, controller 108 may maintain an HPB read list with the HPB entries requested by host 102. During a background relocation operation, controller 108 may look at the physical-to-logical table for a chosen source meta block and determine the associated logical addresses in that meta block. Controller 108 may compare those logical addresses with the HPB entries in the HPB read list. Based on the comparison, controller 108 may identify if there are HPB entries in the meta block. Controller 108 may execute the source selection algorithm including criteria to enable controller 108 to select blocks having no logical block addresses that are associated with active HPB entries in the HPB cache or to select blocks having a minimum number of logical block addresses that are associated with active HPB entries in the HPB cache.

When controller 108 is selecting a source block for relocation during a background operation, controller 108 may determine if the source block is shown to include a greater number of HPB entries than other potential source blocks. Controller 108 may also determine if the source block is in a format with more bits per cell. Controller 108 may promote the source block in a format with more bits per cell and that is shown to include a greater number of HPB entries for relocation during the background operations over other potential source blocks. For example, controller 108 may improve read performance on storage device 104 during garbage collection by folding data from, for example, an MLC block, shown to include a greater number of HPB entries, to an SLC block. As host 102 has cached entries, host 102 is likely to send read commands on a range of logical block addresses, and because of the garbage collection, storage device 104 may read data requested by host 102 from the SLC block rather than from the MLC block. Controller 108 may set a priority order for folding data from a source block with more bits per cell to a destination block with fewer bits per cell during a relocation operation, wherein the prior order may be determined by the HPB entries in the source block. Controller 108 may thus leverage the state of storage device 104 towards enhanced read performance from high endurance blocks.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
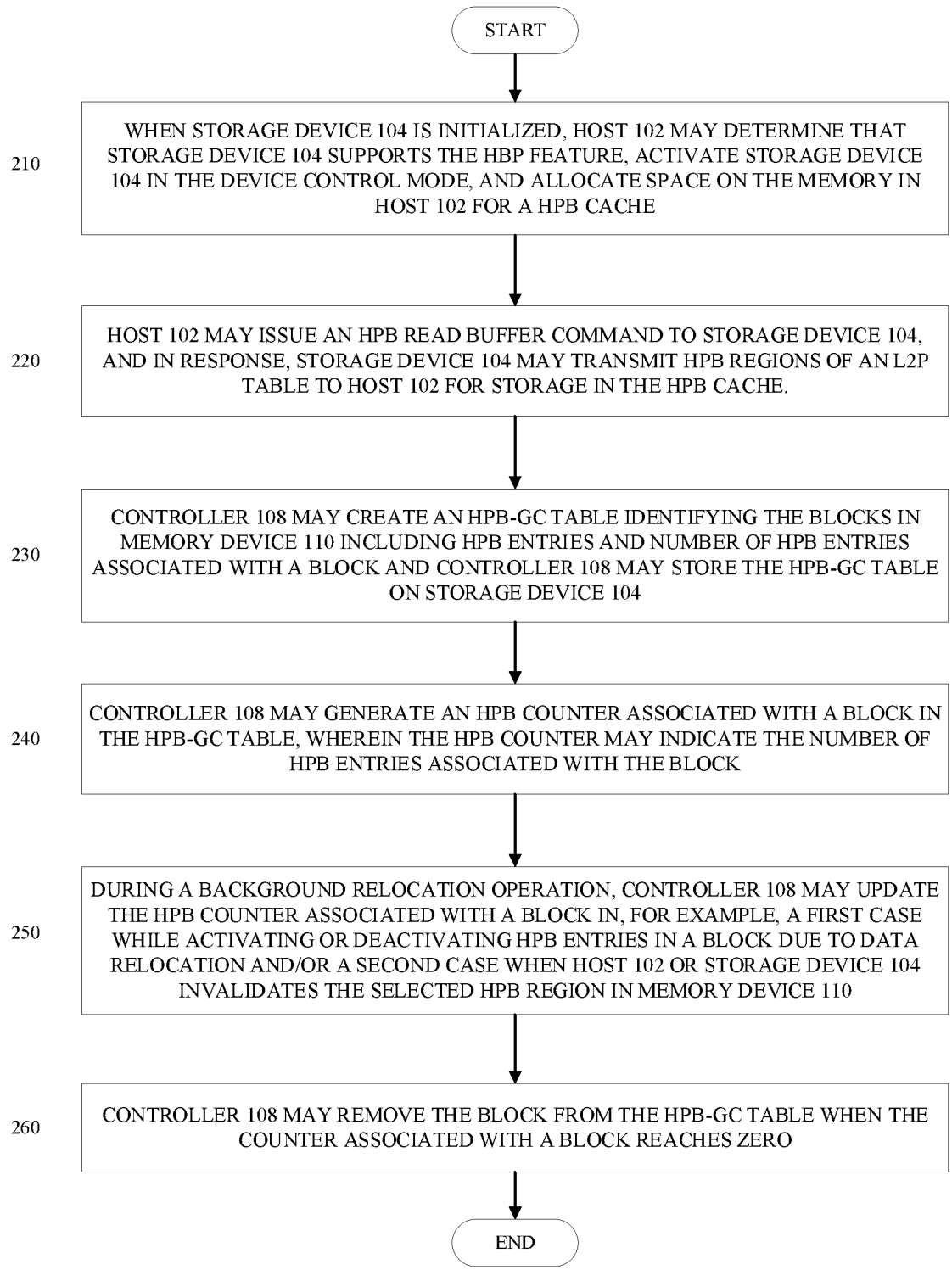
FIG. 2 is a flow diagram of an example process used by a controller in a storage device to keep track of HPB entries in a block in a memory device in accordance with some implementations.

FIG. 2 is a flow diagram of an example process used by a controller in a storage device to keep track of HPB entries in a block in a memory device in accordance with some implementations. At 210, when storage device 104 is initialized, host 102 may determine that storage device 104 supports the HBP feature, and host 102 may activate a device-control mode or host-controlled mode on storage device 104 and allocate space in the host memory for an HPB cache. At 220, host 102 may issue an HPB read buffer command to storage device 104, and in response, storage device 104 may transmit HPB regions of an L2P table to host 102 for storage in the HPB cache. At 230, controller 108 may create an HPB-GC table identifying the blocks in memory device 110 including HPB entries and the number of HPB entries associated with a block, and controller 108 may store the HPB-GC table on storage device 104. At 240, controller 108 may generate an HPB counter associated with a block in the HPB-GC table, wherein the HPB counter may indicate the number of HPB entries associated with the block. At 250, during a background relocation operation, controller 108 may update the HPB counter associated with a block in, for example, a first case while activating or deactivating HPB entries in a block due to data relocation and/or a second case when host 102 or storage device 104 invalidates the selected HPB region in memory device 110. At 250, controller 108 may remove the block from the HPB-GC table when the counter associated with a block reaches zero. As indicated above FIG. 2 is provided as an example. Other examples may differ from what is described in FIG. 2.

Figure 3:
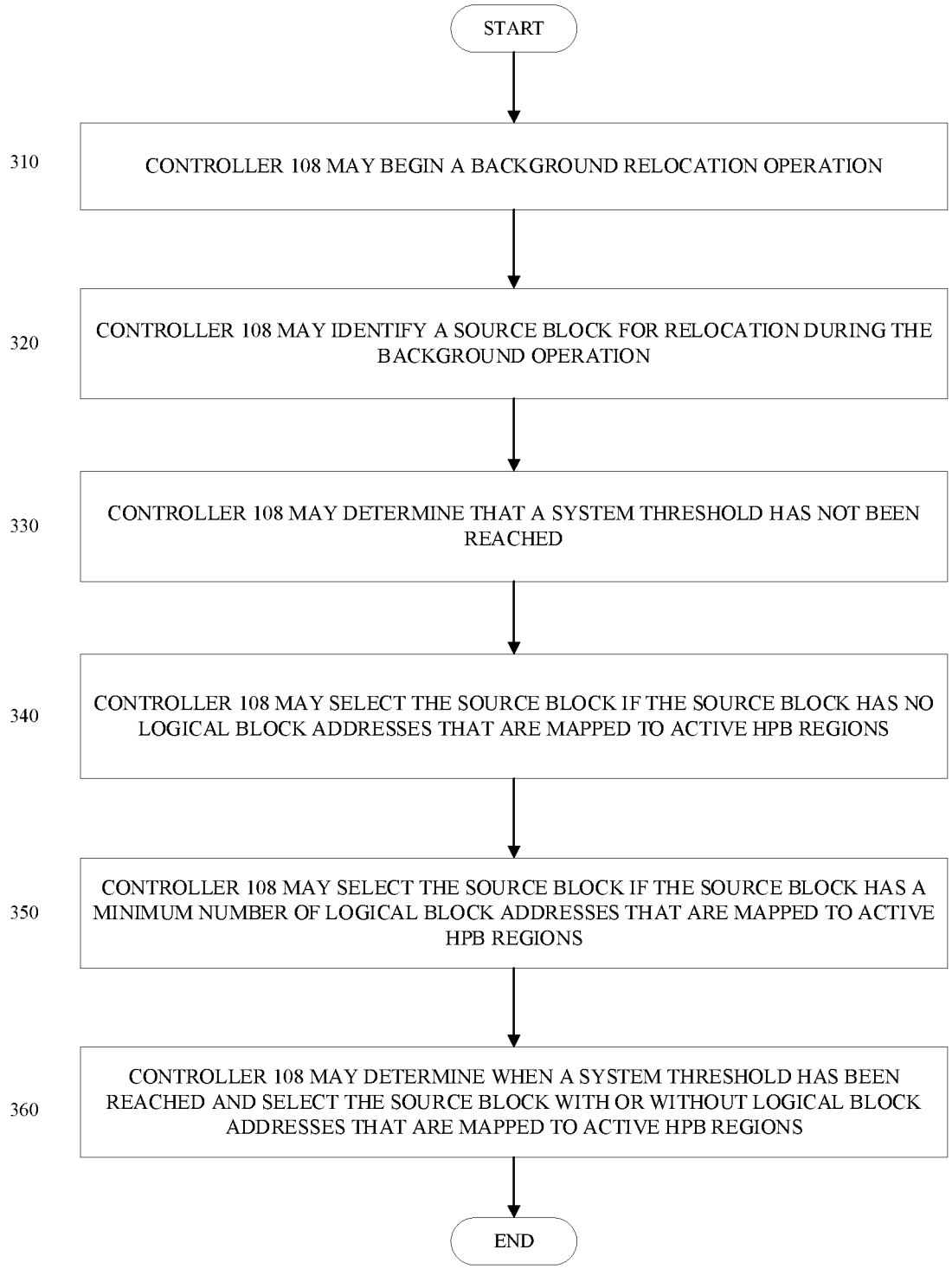
FIG. 3 is a flow diagram of an example process for selecting a source block during a background relocation operation when blocks on the memory device include HPB entries in accordance with some implementations.

FIG. 3 is a flow diagram of an example process for selecting a source block during a background relocation operation when blocks on the memory device include HPB entries in accordance with some implementations. At 310, controller 108 may begin a background relocation operation. At 320, controller 108 may identify a source block for relocation during the background operation. At 330, controller 108 may determine that a system threshold has not been reached. At 340, controller 108 may select the source block if the source block has no logical block addresses that are mapped to active HPB regions. At 350, controller 108 may select the source block if the source block has a minimum number of logical block addresses that are mapped to active HPB regions. At 360, controller 108 may determine when a system threshold has been reached and select the source block with or without logical block addresses that are mapped to active HPB regions. As indicated above FIG. 3 is provided as an example. Other examples may differ from what is described in FIG. 3.

Figure 4:
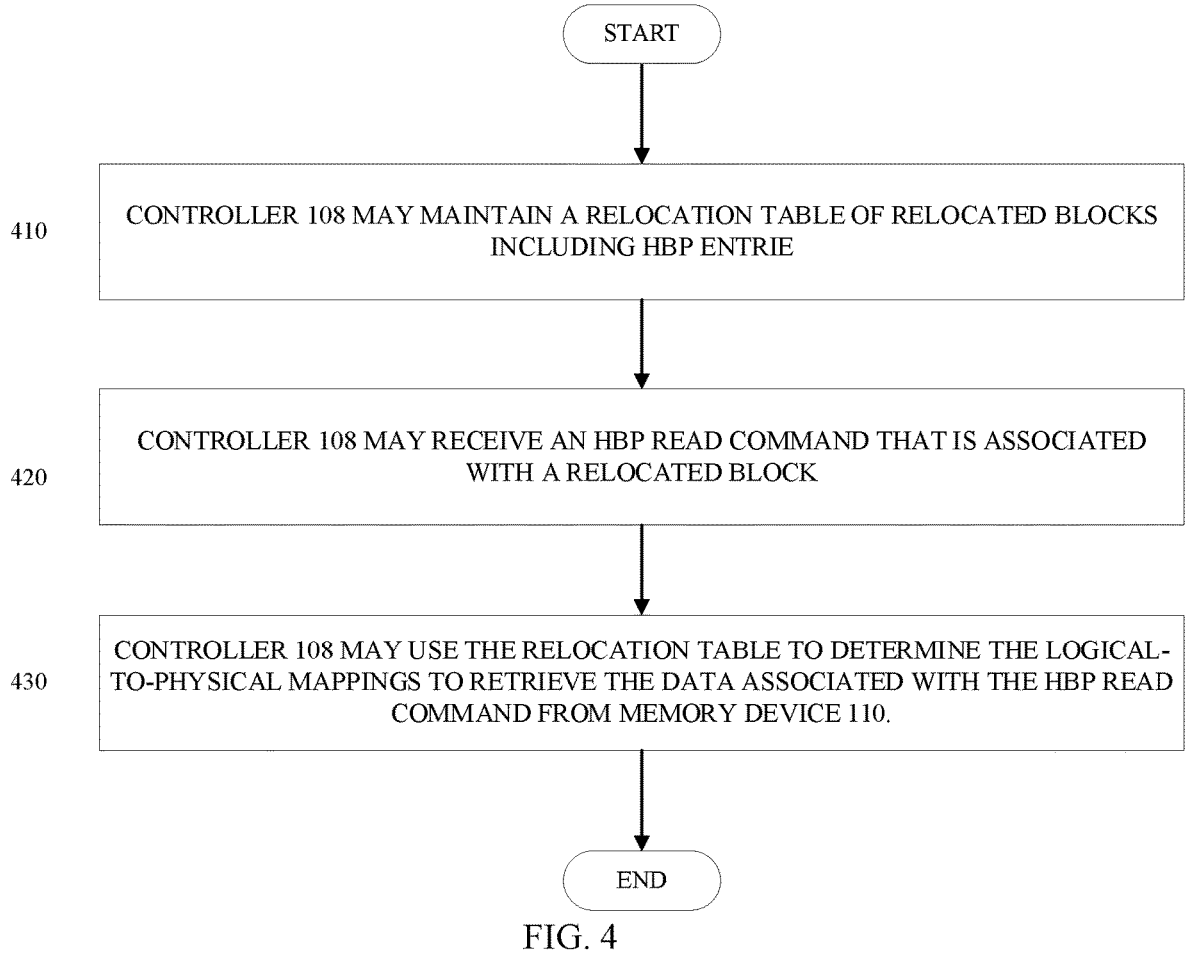
FIG. 4 is a flow diagram of an example process for retrieving data from a block in the memory device including an HPB entry and relocated during a background operation in accordance with some implementations.

FIG. 4 is a flow diagram of an example process for retrieving data from a block in the memory device including an HPB entry and relocated during a background operation in accordance with some implementations. At 410, controller 108 may maintain a relocation table of relocated blocks including HBP entries. At 420, controller 108 may receive an HBP read command that is associated with a relocated block. At 430, controller 108 may use the relocation table to determine the logical-to-physical mappings to retrieve the data associated with the HBP read command from memory device 110. As indicated above FIG. 4 is provided as an example. Other examples may differ from what is described in FIG. 4.

Figure 5:
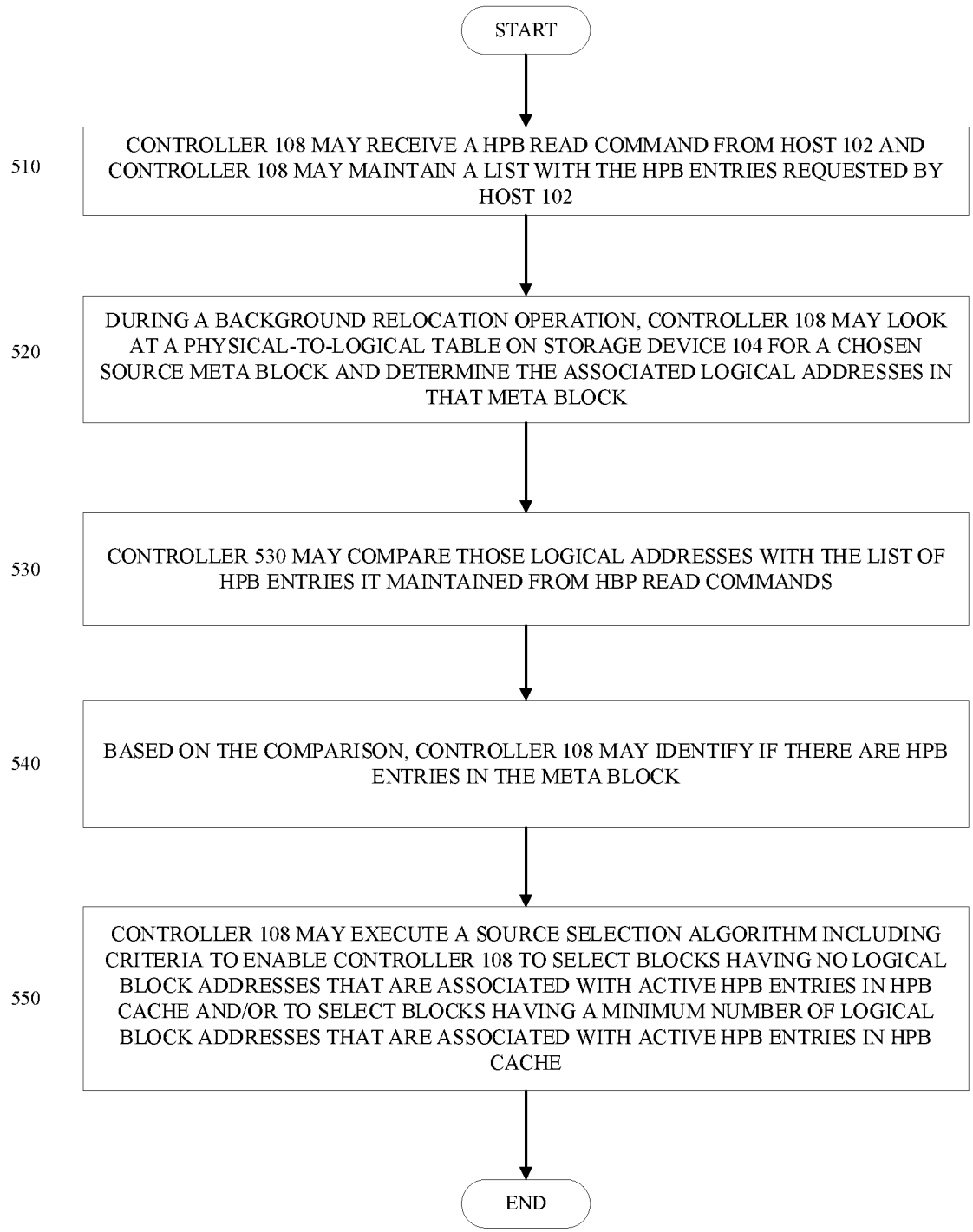
FIG. 5 is another flow diagram of an example process for selecting a source block during a background relocation operation when blocks on the memory device include HPB entries in accordance with some implementation.

FIG. 5 is another flow diagram of an example process for selecting a source block during a background relocation operation when blocks on the memory device include HPB entries in accordance with some implementation. At 510, controller 108 may receive a HPB read command from host 102 and controller 108 may maintain a list with the HPB entries requested by host 102. At 520, during a background relocation operation, controller 108 may look at a physical-to-logical table on storage device 104 for a chosen source meta block and determine the associated logical addresses in that meta block. At 530, controller 530 may compare those logical addresses with the list of HPB entries it maintained from HBP read commands. At 540, based on the comparison, controller 108 may identify if there are HPB entries in the meta block. At 550, controller 108 may execute a source selection algorithm including criteria to enable controller 108 to select blocks having no logical block addresses that are associated with active HPB entries in HPB cache and/or to select blocks having a minimum number of logical block addresses that are associated with active HPB entries in HPB cache. As indicated above FIG. 5 is provided as an example. Other examples may differ from what is described in FIG. 5.

Figure 6:
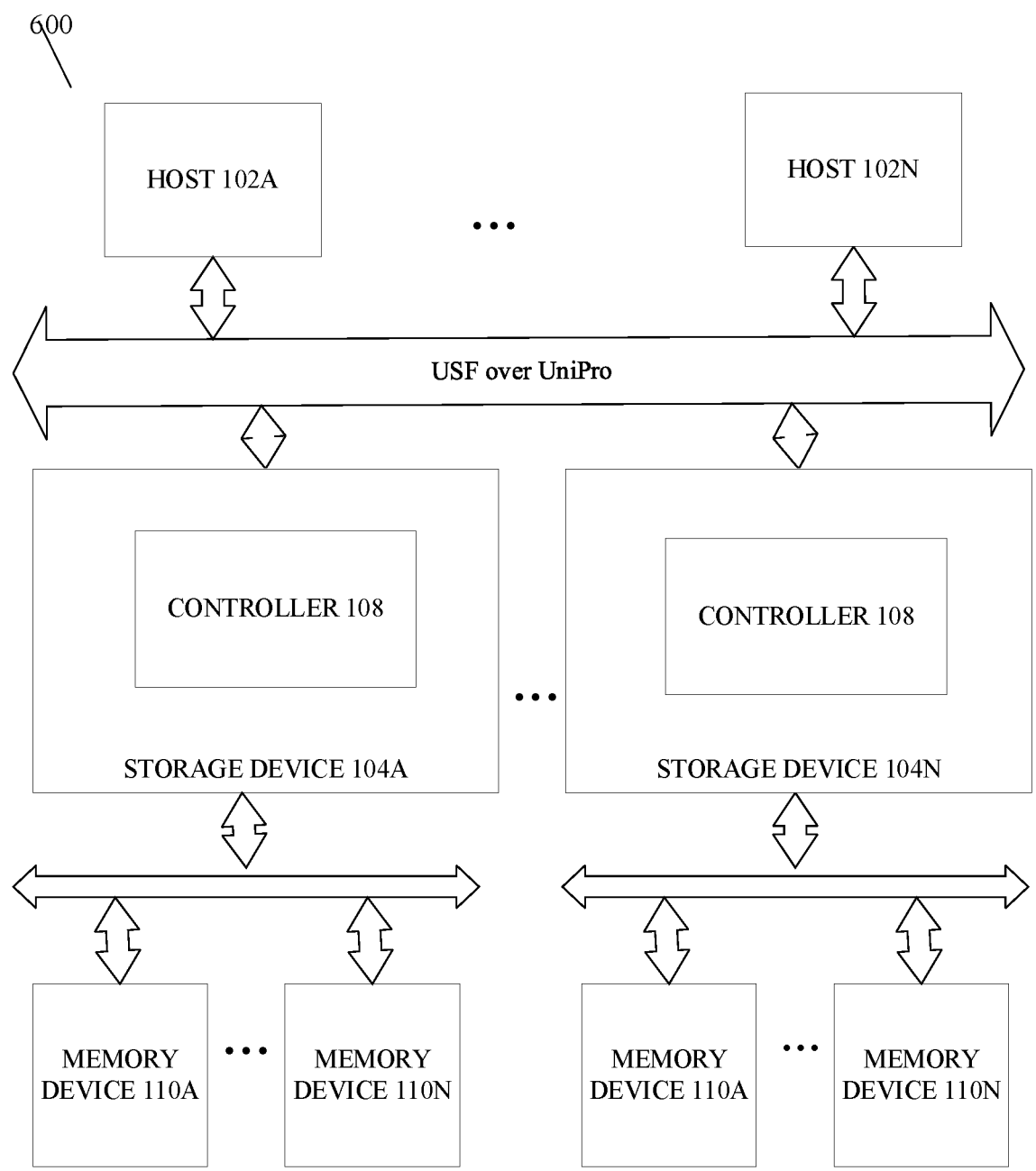
FIG. 6 is a diagram of an example environment in which systems and/or methods described herein are implemented.

FIG. 6 is a diagram of an example environment in which systems and/or methods described herein are implemented. As shown in FIG. 6, Environment 600 may include hosts 102-102n (referred to herein as host(s) 102), and storage devices 104a-104n (referred to herein as storage device(s) 104).

Storage device 104 may include a controller 108 to manage the resources on storage device 104. Controller 108 may improve the HPB read performance of storage device 104 by avoiding or delaying the relocation of source blocks with logical block addresses that are mapped to active HPB regions until, for example, a system threshold is reached or until host 102 clears the associated HPB entry. Hosts 102 and storage devices 104 may communicate via the Universal Flash Storage (UFS) over Unipro, or the like.

Devices of Environment 600 may interconnect via wired connections, wireless connections, or a combination of wired and wireless connections. For example, the network of FIG. 6 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of Environment 600 may perform one or more functions described as being performed by another set of devices of Environment 600.

Figure 7:
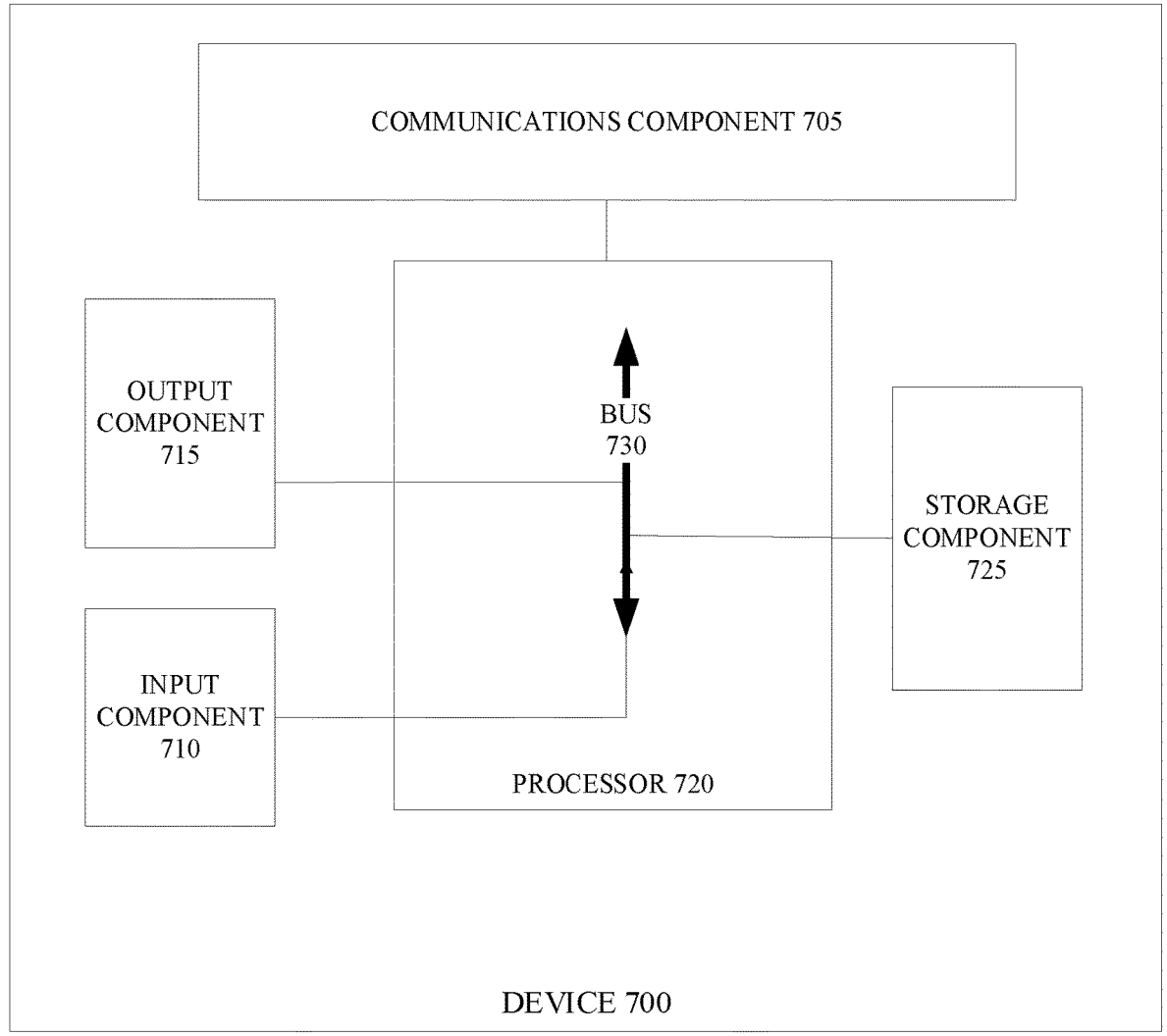
FIG. 7 is a diagram of example components of the host of FIG. 1.

FIG. 7 is a diagram of example components of one or more devices of FIG. 1. In some implementations, host 102 may include one or more devices 700 and/or one or more components of device 700. Device 700 may include, for example, a communications component 705, an input component 710, an output component 715, a processor 720, a storage component 725, and a bus 730. Bus 730 may include components that enable communication among multiple components of device 700, wherein components of device 700 may be coupled to be in communication with other components of device 700 via bus 730.

Input component 710 may include components that permit device 700 to receive information via user input (e.g., keypad, a keyboard, a mouse, a pointing device, a microphone, and/or a display screen), and/or components that permit device 700 to determine the location or other sensor information (e.g., an accelerometer, a gyroscope, an actuator, another type of positional or environmental sensor). Output component 715 may include components that provide output information from device 700 (e.g., a speaker, display screen, and/or the like). Input component 710 and output component 715 may also be coupled to be in communication with processor 720.

Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 may include one or more processors capable of being programmed to perform a function. Processor 720 may be implemented in hardware, firmware, and/or a combination of hardware and software.

Storage component 725 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 720. A memory device may include memory space within a single physical storage device or memory space spread across multiple physical storage devices. Storage component 725 may also store information and/or software related to the operation and use of device 700. For example, storage component 725 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 705 may include a transceiver-like component that enables device 700 to communicate with other devices, such as via a wired connection, a wireless connection, or a combination of wired and wireless connections. The communications component 705 may permit device 700 to receive information from another device and/or provide information to another device. For example, communications component 705 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 705 may also include one or more broadband and/or narrowband transceivers and/or other similar types of wireless transceiver configurable to communicate via a wireless network for infrastructure communications. Communications component 705 may also include one or more local area network or personal area network transceivers, such as a Wi-Fi transceiver or a Bluetooth transceiver.

Device 700 may perform one or more processes described herein. For example, device 700 may perform these processes based on processor 720 executing software instructions stored by a non-transitory computer-readable medium, such as storage component 725. As used herein, the term "computer-readable medium" refers to a non-transitory memory device. Software instructions may be read into storage component 725 from another computer-readable medium or from another device via communications component 705. When executed, software instructions stored in storage component 725 may cause processor 720 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more" The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to support a host performance booster (HPB) feature, the storage device is communicatively coupled to a host device, the storage device comprises:
    a memory device divided into blocks, wherein data is stored on the blocks in the memory device; and
    a controller to execute a background relocation operation, and during the background relocation operation, to identify a block to relocate data from, determine that a relocation system threshold has not been reached, and execute a source selection algorithm configured to minimize HPB entry inactivation resulting from data relocation, the source selection algorithm including a criterion to enable the controller to select the block as a source block for relocation.

2. The storage device of claim 1, wherein the controller receives an HPB read buffer command from the host device and creates an HPB-garbage collection table according to HPB buffer read requests, the HPB-garbage collection table including information that identifies the blocks in the memory device including HPB entries and an HPB counter to identify a number of HPB entries associated with the block.

3. The storage device of claim 2, wherein the controller updates the HPB counter associated with the block while activating or deactivating HPB entries in the block due to data relocation in the memory device.

4. The storage device of claim 2, wherein the controller removes the block from the HPB-garbage collection table when the counter for the block becomes zero.

5. The storage device of claim 1, wherein the source selection algorithm includes at least one of a first criterion to select blocks having no logical block addresses that are associated with active HPB entries and a second criterion to select blocks with a minimum number of HPB mapping.

6. The storage device of claim 1, wherein the controller creates a relocation table including relocated HBP entries and uses the relocation table to determine how to retrieve data associated with an HBP read command from the memory device.

7. The storage device of claim 1, wherein the controller informs the host device of relocation of the source block including an HPB entry and sends an updated logical-to-physical mapping for the relocated source to the host device.

8. The storage device of claim 1, wherein the controller identifies that the block is to be used in data relocation operations when an HPB entry in the block is removed from an HPB cache in the host device and no other HPB entries are associated with the block.

9. The storage device of claim 1, wherein the controller maintains an HPB read list with HPB entries requested by the host device, and during the background relocation operation, the controller determines associated logical addresses in the block from a physical-to-logical table, compares the logical addresses with HPB entries in the HPB read list, and identifies if there are HPB entries in the block.

10. The storage device of claim 1, wherein the controller sets a priority order for folding data from the source block with more bits per cell to a destination block with fewer bits per cell during the background relocation operation, wherein the priority order is determined by HPB entries in the source block.

11. A method for minimizing host performance booster (HPB) entry inactivation resulting from data relocation in a storage device supporting a HPB feature, the method comprising:
 activating the storage device to support the HPB feature;
 executing, by a controller on the storage device, a background relocation operation; and
 during the background relocation operation identifying, by the controller, a block to relocate data from, determining that a relocation system threshold has not been reached, and executing a source selection algorithm configured to minimize HPB entry inactivation resulting from data relocation, the source selection algorithm including a criterion to enable the controller to select the block as a source block for relocation.

12. The method of claim 11, further comprising receiving, by the controller, an HPB read buffer command from a host device and creating an HPB-garbage collection table according to HPB buffer read requests, the HPB-garbage collection table including information that identifies the blocks in a memory device including HPB entries and an HPB counter to identify a number of HPB entries associated with the block.

13. The method of claim 12, further comprising updating the HPB counter associated with the block while at least one of activating or deactivating HPB entries in the block due to data relocation and when the host device or the storage device invalidates cached HPB region in the memory device; and
 removing the block from the HPB-garbage collection table when the counter for the block becomes zero.

14. The method of claim 11, wherein the source selection algorithm includes at least one of a first criterion to select blocks having no logical block addresses that are associated with active HPB entries and a second criterion to select blocks with a minimum number of HPB mapping.

15. The method of claim 11, further comprising creating a relocation table including relocated HBP entries and using the relocation table to determine how to retrieve data associated with an HBP read command from a memory device.

16. The method of claim 11, further comprising informing a host device of relocation of the source block including an HPB entry and sending an updated logical-to-physical mapping for a relocated source to the host device.

17. The method of claim 11, further comprising identifying that the block is to be used in data relocation operations when an HPB entry in the block is removed from an HPB cache in a host device and no other HPB entries are associated with the block.

18. The method of claim 11, further comprising maintaining an HPB read list with HPB entries requested by a host device, and during the background relocation operation, determining associated logical addresses in the block from a physical-to-logical table, comparing the logical addresses with HPB entries in the HPB read list, and identifying if there are HPB entries in the block.

19. The method of claim 11, further comprising setting a priority order for folding data from a source block with more bits per cell to a destination block with fewer bits per cell during the background relocation operation, wherein the prior priority order is determined by HPB entries in the source block.

20. A method for minimizing host performance booster (HPB) entry inactivation resulting from data relocation in a storage device supporting a HPB feature, the method comprising:
 activating the storage device to support the HPB feature;
 initiating, by a controller on the storage device, a background relocation operation; and
 identifying, by the controller, a source block to relocate data from and determining that a relocation system threshold has not been reached;
 one of:
  1) Creating an HPB-garbage collection table according to HPB buffer read requests, and
  2) Determining associated logical addresses in the source block from a physical-to-logical table, comparing the logical addresses with HPB entries in a HPB read list, and identifying if there are HPB entries in the source block; and
 executing a source selection algorithm configured to minimize HPB entry inactivation resulting from data relocation, the source selection algorithm including a criterion to enable the controller to select the source block for relocation using one of the HPB-garbage collection table and the HPB read list.

* * * * *